United States Patent
Shrivastava et al.

(10) Patent No.: US 10,834,779 B2
(45) Date of Patent: Nov. 10, 2020

(54) SYSTEM AND METHOD FOR PROVIDING MULTIMEDIA BROADCAST MULTICAST SERVICE (MBMS) OPERATION

(71) Applicant: Samsung Electronics Co., Ltd., Suwon-si (KR)

(72) Inventors: Vinay Kumar Shrivastava, Bangalore (IN); Rohan Raj, Bangalore (IN); Shrinath Ramamoorthy Madhurantakam, Bangalore (IN); Swapnil Vinod Khachane, Bangalore (IN); Seung-Ri Jin, Suwon-si (KR); Piyush Makhija, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 5 days.

(21) Appl. No.: 16/325,313

(22) PCT Filed: Aug. 14, 2017

(86) PCT No.: PCT/KR2017/008849
§ 371 (c)(1),
(2) Date: Feb. 13, 2019

(87) PCT Pub. No.: WO2018/034475
PCT Pub. Date: Aug. 22, 2018

(65) Prior Publication Data
US 2019/0208570 A1 Jul. 4, 2019

(30) Foreign Application Priority Data

Aug. 14, 2016 (IN) .............................. 201641027771
Feb. 6, 2017 (IN) .............................. 201741004272
Aug. 8, 2017 (IN) .............................. 201741004272

(51) Int. Cl.
*H04W 76/40* (2018.01)
*H04W 68/00* (2009.01)
(Continued)

(52) U.S. Cl.
CPC ............. *H04W 76/40* (2018.02); *H04W 4/06* (2013.01); *H04W 4/30* (2018.02); *H04W 68/00* (2013.01);
(Continued)

(58) Field of Classification Search
CPC ....... H04W 72/005; H04W 4/06; H04W 4/30; H04W 76/20; H04W 76/28; H04W 76/40; H04W 68/00
See application file for complete search history.

(56) References Cited

U.S. PATENT DOCUMENTS 8,830,894 B2 9/2014 Xu
2009/0318177 A1* 12/2009 Wang .................. H04W 68/025
455/515

(Continued)

FOREIGN PATENT DOCUMENTS

WO WO-2018-034473 A1 2/2018

OTHER PUBLICATIONS

Samsung; "SI and MCCH change notification reception", R2-166472; 3GPP TSG RAN WG2 Meeting #95bis, Kaohsiung, Taiwan, Oct. 10-14, 2016.
(Continued)

Primary Examiner — Kevin C. Harper
(74) Attorney, Agent, or Firm — Harness, Dickey & Pierce P.L.C.

(57) ABSTRACT

The various embodiments of the present invention disclose a system and method for multimedia broadcast multicast service (MBMS) operation, the method comprises of receiving, by a User Equipment (UE), a common notification
(Continued)

configuration message for a Multi-Cast Control Channel (MCCH) and System Information (SI) change from a network, identifying one or more occasions where MCCH or SI change notification is to be scheduled, configuring, by the UE, a DRX sleep and wake up occasions for the UE based on the scheduling of the MCCH and the SI change notification period, monitoring for MCCH change or SI change notification on Physical Downlink Control Channel PDCCH Format 1C scrambled with M-RNTI on wakeup occasion, determining the change notification based on DCI bits pertaining to SI and/or MCCH of one or more MBMS area, and decoding indicated SI and/or MCCH on PDSCH on CAS sub-frames and/or PMCH channel of respective areas.

20 Claims, 11 Drawing Sheets

(51) Int. Cl.

| | | |
|---|---|---|
| *H04W 4/06* | (2009.01) | |
| *H04W 72/00* | (2009.01) | |
| *H04W 76/20* | (2018.01) | |
| *H04W 4/30* | (2018.01) | |
| *H04W 76/28* | (2018.01) | |

(52) U.S. Cl.
CPC ......... *H04W 72/005* (2013.01); *H04W 76/20* (2018.02); *H04W 76/28* (2018.02)

(56) References Cited

U.S. PATENT DOCUMENTS

| | | |
|---|---|---|
| 2012/0127913 A1 | 5/2012 | Lin et al. |
| 2014/0185455 A1 | 7/2014 | Balasubramanian et al. |

OTHER PUBLICATIONS

Samsung; "8.10.2 Discussion and Decision", R2-165085; 3GPP TSG RAN WG2 Meeting #95, Gothenburg, SE, Aug. 22-26, 2016.

Samsung; "MCCH and SI Change Notification", R2-1701276, 3GPP TSG RAN WG2 Meeting #97 Athens, Greece, Feb. 13-17, 2017.

Samsung; "Clarification on MBMS Notification Configuration", R2-1703002; 3GPP TSG RAN WG2 Meeting #97-Bis, Spokane, USA, Apr. 3-7, 2017.

Samsung; "MCCH and MCCH change notification", R2-165088,; 3GPP TSG RAN WG2 Meeting #95, Gothenburg, SE, Aug. 22-26, 2016.

Samsung; "Counting Procedure", R2-1701277; 3GPP TSG RAN WG2 Meeting #97, Athens, Greece, Feb. 13-17, 2017.

ZTE; "Missing agreement in MCCH change notification", R2-100318; #GPP TSG RAN WG2 #68bis, Valencia, Spain, pp. 1-3, Jan. 12, 2010, see section 5.8.1.3.

Motorola; "MCCH Information Change Notification", R2-100558; 3GPP TSG RAN WG2 #68bis, Valencia, Spain, pp. 1-3, Jan. 12, 2010 See sections 2-3.

LG Electronics Inc., "SI Change Notification", R2-100333; 3GPP TSG-RAN2 Meeting #bis, Valencia, Spain, pp. 1-3, Jan. 12, 2010 See Section 2.

International Search Report PCT/ISA/210 for PCT International Applcation No. PCT/KR2017/008849 dated Nov. 17, 2017.

Written Opinion PCT/ISA/237 for PCT International Applcation No. PCT/KR2017/008849 dated Nov. 17, 2017.

\* cited by examiner

SYSTEM AND METHOD FOR PROVIDING MULTIMEDIA BROADCAST MULTICAST SERVICE (MBMS) OPERATION

CROSS-REFERENCE TO RELATED APPLICATION

This application is a National Stage Entry of International Application No. PCT/KR2017/008849 filed Aug. 14, 2017, and which claims priority to Indian Complete Patent Application Serial No. 201641027771 filed on Aug. 14, 2016, in the Indian Intellectual Property Office and to Indian Provisional Patent Application Serial No. 201741004272 filed on Feb. 6, 2017, and to Indian Complete Patent Application Serial No. 201741004272 filed on Aug. 8, 2017 in the Indian Intellectual Property Office, the entire disclosure of each of which is incorporated herein by reference.

BACKGROUND

1. Field

The present invention relates to wireless communication systems and more particularly, to a system and method for Multimedia Broadcast Multicast Service (MBMS) operation.

2. Description of the Related Art

Evolved Multimedia Broadcast Multicast Service (eMBMS) provides an efficient way to deliver download as well as streaming content to multiple users. Especially mobile video streaming is foreseen to generate a major volume of network data traffic in the future. Commercial deployments of eMBMS or "LTE Broadcast" are generating increasing interest. In order to meet the industry and operators' demand, it is important to enhance eMBMS even further.

Release 14 version of 3GPP is targeting to enable widespread reach for television services across masses. Many system and architecture solutions are being envisaged to meet these requirements as well as to enhance and extend the limitations with the legacy systems. For example, previously MBMS system was limited to maximum 60% allocation for the radio resources as from the total 10 sub-frames available in a frame only 6 can be allocated for MBMS service transmission whereas other sub-frames were not allocated due to their possible support for the paging purpose. This limitation is being targeted in new system so that to enhance the allocation for MBMS services to up to 100%.

3GPP networks are looking at providing unicast and broadcast transport to support distribution of TV programs. It can support three types of TV services—Free-to-air (FTA), Free-to-view (FTV), and Subscribed services. Each type of the TV service has different requirements in order to meet regulatory obligations and public service and commercial broadcaster's requirements regarding content distribution.

One other enhancement objective is to provide wide coverage (Inter-Site distances of 100 KM and larger). This requires usage of longer cycle prefix for the OFDM (Orthogonal Frequency Division Multiplexing) and associated signaling procedures.

Another use case with using multi-carrier support for MBMS is where Mobile Network Operators have agreed that UEs subscribed to one network shall be able to receive certain MBMS service(s) from another network. One scenario is MBMS in a stadium where the stadium-related service should be received by UEs regardless to which network they are subscribed. Another scenario is a wide-area TV service provided over MBMS that shall be accessible by UEs regardless of subscription.

Potentially, different device configurations are possible that cater to different level of service operation e.g. a "broadcast only device" which just receives MBMS service from a standalone MBMS carrier and does not support any other function. A possible use-case for this can be Television sets which can utilize standalone MBMS carrier reception to provide TV services to the users. Another category of the devices could be one which supports both receptions of MBMS and unicast services with a single receiver and/or multiple receiver capability.

In order to serve different types devices, and different states of operation e.g. in idle mode or in connected mode, 3GPP is planning to develop primarily two solutions. One of the solutions is the standalone MBMS carrier approach as discussed earlier and it provides a cell which is 100% allocated for MBMS purpose and has self-contained MBMS signaling and system information messages. Devices on this standalone carrier can receive MBMS information in downlink. Notably there is no uplink transmission in the standalone MBMS carrier.

Other solution is providing MBMS services through a dedicated carrier, termed as MBMS-dedicated cell that is associated with the non-dedicated carriers, called as Primary Cells (PCells), of the receiving UEs. UEs, therefore, receives MBMS services through MBMS-dedicated cell and continues to receive unicast service and/or paging/system information from the PCell based on the idle or connected state of the device.

Other solution is providing MBMS services through a dedicated carrier (Secondary Cell, SCell) that is associated with the non-dedicated carriers (Primary Cells, PCells) of the receiving UEs. UE, therefore, receive MBMS services through dedicated MBMS cell and continues to receive unicast service and/or paging/system information from the serving cell (PCell) based on the idle or connected state of the device.

As of the present Release 14 version of 3GPP standards is under development and many of the potential issues related to the new MBMS solution is not yet been addressed.

In view of the foregoing, there is a need for a system and method that addresses the herein above mentioned issues and problems and attempt to provide methods and solutions.

The above-mentioned shortcomings, disadvantages and problems are addressed herein and which will be understood by reading and studying the following specification.

SUMMARY

The various embodiments of the present invention disclose a system and method for providing multimedia broadcast multicast service (MBMS) operation. The embodiment herein is adapted to address the significant issues for the MBMS dedicated cell with respect to the delivery of multicast control channel (MCCH) information change notification and system information change notification when the concerned information has any changes.

The embodiments of the present invention discloses a two-step approach comprising a notification for change of information and decoding of the updated information, which helps in power saving and reduction in processing time as the user equipment (UE) is informed in beforehand about the SI change through a notification. This in turn avoids decoding of the information if it is not relevant or applicable to it.

Further, a modification period is followed to provide notification in the preceding modification period and the actual change or updated information in the following modification period.

According to the present invention, the MCCH information change notification indicates the change of MCCH information in the following modification period and may be related to start of a new session/service, presence of a counting request message, and the like. Similarly, some notification for system information change is needed to make UE avail the updated system information again. In the conventional systems, this is indicated through a paging message, which is sent through the paging channel at the wake up occasion of the concerned UE and carries indication of change.

Another important aspect is related to detection of MBMS system information change. In the existing art, there is no distinct indication for change of MBMS part of system information. The System information change in general is indicated through "paging for system information modification", which affects all the UEs whether MBMS or non-MBMS. Moreover, MBMS dedicated cell does not support paging. The embodiments disclosed herein can be used to indicate change of the system and control information to the UE.

According to an embodiment of the present invention, a method for providing multimedia broadcast multicast service (MBMS) operation, the method comprising steps of receiving, by a User Equipment (UE), a common notification configuration message for a Multi-Cast Control Channel (MCCH) and System Information (SI) change from a network, identifying one or more occasions where MCCH or SI change notification is to be scheduled using one or more parameters received in the common notification configuration message, configuring, by the UE, a DRX sleep and wake up occasions for the UE based on the scheduling of the MCCH and the SI change notification period, monitoring for MCCH change and/or SI change notification on Physical Downlink Control Channel (PDCCH) Format 1C scrambled with MBMS-Radio Network Temporary Identifier for MBMS (M-RNTI) on wakeup occasion, determining the change notification based on DCI bits pertaining to SI and/or MCCH of one or more MBMS area, and decoding indicated SI and/or MCCH on PDSCH on Cell acquisition sub-frames (CAS) and/or PMCH channel of respective areas.

According to an embodiment of the present invention, the SI Change and MCCH change notification is indicated together through a PDCCH DCI Format 1C on non-MBSFN sub-frame and is decoded by M-RNTI. According to another embodiment of the present invention, the new bit is defined for SI change indication and 8 bits for MCCH change indication for 8 different MBSFN areas.

According to an embodiment of the present invention, the SI change and/or MCCH change notification is provided through one or more reserved sub-frames carrying Physical Downlink Control Channel (PDCCH)/Downlink Control Information (DCI) on dedicated MBMS cell, where the one or more sub-frames comprises at least one of Master Information Block (MIB), Primary synchronization signals (PSS), Secondary Synchronization Signals (SSS) synchronization signals and System Information Blocks (SIB) information on a dedicated MBMS carrier.

According to an embodiment of the present invention, the method further comprises of initializing a siModificationPeriod, subject to changes in the MBMS area configurations for the MBMS-dedicated cell, where the siModificationPeriod is derived as a smallest MCCH modification period of all the MBMS areas in the MBMS-dedicated cell, e.g. when radio configurations changes for the cell or due to mobility of device, MBMS area configurations change in the new cell.

According to another embodiment of the present invention, the siModificationPeriod is fixed as the smallest of all possible values of MCCH modification period. For an instance, 512rf is the smallest MCCH modification period among the possible values of rf512 and rf1024, where rf512 corresponds to 512 radio frames, and rf1024 corresponds to 1024 radio frames.

According to another embodiment of the present invention, the siModificationPeriod is a sub-multiple or multiple of MCCH modification period to ensure common occasion of the MCCH information change and system information change notifications in time domain.

According to an embodiment of the present invention, the method further comprises of transmitting, by the UE, the MCCH information change or system information change notifications on the PDCCH periodically on a CAS sub-frame, where the MCCH information change notification occasions are common for one or more MCCHs that are configured and configurable by one or more parameters included in a SystemInformationBlockType13, wherein the one or more parameters included in a SystemInformationBlockType13 comprises of, but not limited to, a repetition coefficient, a radio frame offset, a SI modification period, and the like, without departing from the scope of the invention. The CAS sub-frame is repeated every 40 msec. Therefore, the MCCH information change or the system information change notification occasions are spaced at multiples of 40 msec apart, with minimum value being 40 msec.

According to an embodiment of the present invention, the common notification occasions are based on the MCCH with a shortest modification period, wherein the shortest modification period corresponds to a lowest value of the MCCH ModificationPeriod of all the MCCHs that are configured.

According to an embodiment of the present invention, the MCCH information change or system information change notification is scheduled in radio frames for which an SFN MOD notification repetition period is equal to a notificationOffset, where a notificationRepetitionCoefficient indicates a number of repetitions of MCCH change or SI change indication in the modification period. That is, it corresponds to one or more radio frames having CAS sub-frame in which the MCCH information change or system information change notification is provided in the modification period.

According to an embodiment of the present invention, the parameters notificationRepetitionCoeff and notificationOffset define a selected CAS that is the System Frame Number (SFN) of the radio frame having CAS to carry notification, wherein the notification Offset is configured as 40 ms or multiples of 40 ms to align with the occurrence of the CAS sub-frame.

According to an embodiment of the present invention, the method further comprises of enabling, by the UE, a service continuity during a change in a carrier/cell carrying an MBMS service; wherein the change in carrier/cell is due to at least one of mobility, service unavailability, service signal strength declining below a threshold level or mobility of the UE, informing by the UE, an MBMS reception status on the MBMS-dedicated cell on receiving an interest indication message on the PCell, and setting up, by the UE, a new MBMS-dedicated cell which provides the MBMS reception to the UE, wherein the UE receiving MBMS service through the MBMS-dedicated cell performs measurements for the MBMS signal strength and service quality.

According to an embodiment of the present invention, the measurement report is transmitted on the uplink on PCell and carries identification of the MBMS-dedicated cell and at least one of the identities of the MBSFN area, PMCH, MBMS service.

According to an embodiment of the present invention, the Network adjusts the transmission parameters to meet the signal and quality of the maximum of the receiving UEs based on the measurement reports from the UE.

According to an embodiment of the present invention, the UE can also indicate to utilize unicast mode of the MBMS service reception when the signal/quality of the service is not met with the dedicated MBMS carrier mode of reception.

According to another embodiment of the present invention, a user equipment (UE) for providing multimedia broadcast multicast service (MBMS) operation, the UE is adapted for receiving a common notification configuration message for a Multi-Cast Control Channel (MCCH) and System Information (SI) change from a network, identifying one or more occasions where MCCH or SI change notification is to be scheduled using one or more parameters received in the common notification configuration message, configuring a DRX sleep and wake up occasions for the UE based on the scheduling of the MCCH and the SI change notification period, monitoring for MCCH change and/or SI change notification on Physical Downlink Control Channel PDCCH Format 1C scrambled with M-RNTI on wakeup occasion, determining the change notification based on DCI bits pertaining to SI and/or MCCH of one or more MBMS area, decoding indicated SI and/or MCCH on PDSCH on CAS sub-frames and/or PMCH channel of respective areas.

The various embodiments of the present invention disclose a system and method for enabling Multimedia Broadcast Multicast Service (MBMS) counting.

According to an embodiment of the present invention, a method for multimedia broadcast multicast service (MBMS) counting operation, the method comprises receiving, by an user equipment (UE), an MBMS counting request from a wireless communication network; sending, by the UE, an MBMS counting response message on a dedicated path to the network, if the UE is in connected mode; and triggering, by the UE, a random access channel (RACH) procedure for sending the MBMS counting response message, if the UE is in idle mode.

Further, the method comprises of evaluating, by the UE, a signal condition for sending the MBMS counting response message, and wherein evaluating the signal condition comprises of comparing by the UE, the signal condition of a present signal with a preset threshold parameter received from the network; sending, by the UE, the MBMS counting response message to the network if the evaluated signal condition is more than the preset threshold parameter.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released immediately after the network receives the MBMS counting response message, if the RRC connection is established only for the MBMS counting.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released based on a data inactivity period, if the RRC connection is established not only for MBMS counting.

In an embodiment of the present invention, wherein the UE triggers the RACH procedure by sending a preamble set to indicate the network that the UE has enough buffer size accumulated for a Msg3 and is therefore allocated with a larger msg3 grant; and a MAC control element (CE) to indicate the network purpose of the RACH procedure is to send MBMS counting response message.

In an embodiment of the present invention, wherein the UE triggers the RACH procedure by sending a preamble set to indicate the network that the UE has enough buffer size accumulated for a msg3 and is therefore allocated with a larger msg3 grant; and accommodating MBMS counting response message in allocated grant for Msg3.

Further, the method comprises of terminating the MBMS counting on receiving a HARQ Ack from the network, which indicates a successful transmission of the msg3 is completed.

In an embodiment of the present invention, wherein the UE triggers the RACH procedure for sending the MBMS counting response message if the UE fulfill conditions for path-loss and msg3 buffer size.

Further, the method comprises of performing by the UE if the UE is in the idle mode, a probabilistic estimation on whether to participate in the MBMS counting operation; and wherein a probability factor which determines chances of participation for the UE is provided by at least one of indicating the probability factor in the MBMS counting request by the network based on current loading and/or previous statistic of a counting operation; and preconfigured or signaled as part of MBMS system or control information with at least one of possible values for the probability factor.

In an embodiment of the present invention, wherein the UE selects a time occasion to trigger the RACH procedure base on the probabilistic estimation.

In an embodiment of the present invention, wherein an identity field is provided in the MBMS counting response message for distinguishing different responses messages with respect to an originating PCell and/or PLMN.

In an embodiment of the present invention, wherein an identity field, which indicates MBMS counting procedure release version, is provided in the MBMS counting response message for distinguishing different counting response messages with respect to parallel or multiple counting request procedures corresponding to different release versions.

According to an embodiment of the present invention, a user equipment (UE) for operating multimedia broadcast multicast service (MBMS) counting, the UE is configured to receives an MBMS counting request from a wireless communication network; sends an MBMS counting response message on a dedicated path to the network, if the UE is in connected mode; and triggers a random access channel (RACH) procedure for sending the MBMS counting response message to the network, if the UE is in idle mode.

In an embodiment of the present invention, wherein the UE sets a radio resource control (RRC) connection request cause either as mobile originated (MO)-data or combined MO data-MBMS counting, depending on requirement of the UE to initiate a RRC connection.

According to an embodiment of the present invention, a method for enabling Multimedia Broadcast Multicast Service (MBMS) counting, the method comprising steps of receiving, by an User Equipment (UE), an MBMS counting request from a wireless communication network, sending, by one or more connected mode UEs, an MBMS counting response on a dedicated path to the network, triggering, by one or more Idle mode UEs, a Random Access Channel (RACH) procedure for sending the MBMS counting response, and setting, by the UE, a Radio Resource Control (RRC) connection request cause depending on the request reason set either as mobile originated (MO)-data or combined MO data-MBMS Counting depending on the UEs requirements to initiate the RRC connection.

According to an embodiment of the present invention, the method further comprises steps of evaluating, by the UE, a signal condition for sending MBMS counting response, wherein evaluating the signal condition comprises of comparing by the UE, the signal condition of the present signal with a preset threshold parameter received from the network, and sending, by the UE, an MBMS counting response message to the network if the evaluated signal condition is more than the preset threshold parameter.

In an embodiment of the present invention, the method further comprises of releasing, by the network, the RRC connection immediately after the reception of the MBMS counting response, if the RRC connection is established only for the MBMS Counting purpose as indicated in the RRC connection request cause. In another embodiment of the present invention, UE can utilize a MAC Control Element indicating the purpose of RACH as sending of Counting Response message in the Message 3 which carries RRC connection request.

In an embodiment of the present invention, the method further comprises of releasing, by the network, the RRC connection based on a data inactivity period, if the RRC connection is established for any reason involving MO-data for the sending of MBMS Counting Response message.

In an embodiment of the present invention, the one or more idle UEs triggers the RACH procedure by sending at least one of, but not limited to, a preamble set to indicate the network that the UE has more buffer size accumulated for a Msg3 and is therefore allocated with a larger msg3 grant, a MAC Control Element (CE) to indicate the network the purpose of the RACH procedure is to send MBMS Counting Response message, and the like, without departing from the scope of the invention. In an embodiment of the present invention entire MBMS Counting Response message can be accommodated within the received msg3 grant received.

In another embodiment of the present invention, the one or more idle UEs trigger the RACH procedure by sending at least one of, but not limited to, a preamble set to indicate the network that the UE has more buffer size accumulated for a Msg3 and is therefore allocated with a larger msg3 grant, accommodating MBMS Counting Response message in allocated grant for Msg3, and the like, without departing from the scope of the invention.

In an embodiment of the present invention, the method further comprises of terminating the MBMS counting on receiving a HARQ ACK from the network, when a successful transmission of the msg3 is completed.

In another embodiment of the present invention, the one or more idle mode UEs triggers the RACH procedure for sending the MBMS counting response only when the one or more idle mode UEs fulfill the conditions for the path-loss and the msg3 buffer size.

In another embodiment of the present invention, the method further comprises of performing by the one or more idle UEs, a probabilistic estimation on whether to participate in the counting operation; wherein a probability factor which determines the chances of participation for each UE is provided by at least one of, but not limited to, indicating the probability factor in the counting request message by the network based on current loading and/or previous statistic of a counting operation, reconfigured or signaled as part of MBMS system or control information with at least one of the possible values for the probability factor, and the like, without departing from the scope of the invention.

In an embodiment of the present invention, the probabilistic estimation enables the UE to select the time occasion to trigger the RACH operation in order to send the counting response message.

In an embodiment of the present invention, an identity field is provided in the counting response message from the UE for distinguishing different responses messages with respect to an originating PCell and/or PLMN. It is because Counting Request is broadcasted on the dedicated MBMS cell, which is part of common MBMS network or PLMN, whereas the UEs responding to the Counting Response message on the different PLMNs where their serving cells are located.

In an embodiment of the present invention, an identity field, which indicates MBMS Counting procedure release version, is provided in the counting response message from the UE for distinguishing different Counting Response messages with respect to parallel or multiple counting request procedures corresponding to different release versions.

The foregoing has outlined, in general, the various aspects of the invention and is to serve as an aid to better understand the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

The embodiments of the present invention provides effects that a two-step approach comprising a notification for change of information and decoding of the updated information, which helps in power saving and reduction in processing time as the user equipment (UE) is informed in beforehand about the SI change through a notification. This in turn avoids decoding of the information if it is not relevant or applicable to it. Further, a modification period is followed to provide notification in the preceding modification period and the actual change or updated information in the following modification period.

BRIEF DESCRIPTION OF THE DRAWINGS

The other objects, features and advantages will occur to those skilled in the art from the following description of the preferred embodiment and the accompanying drawings in which.

Figure 1:
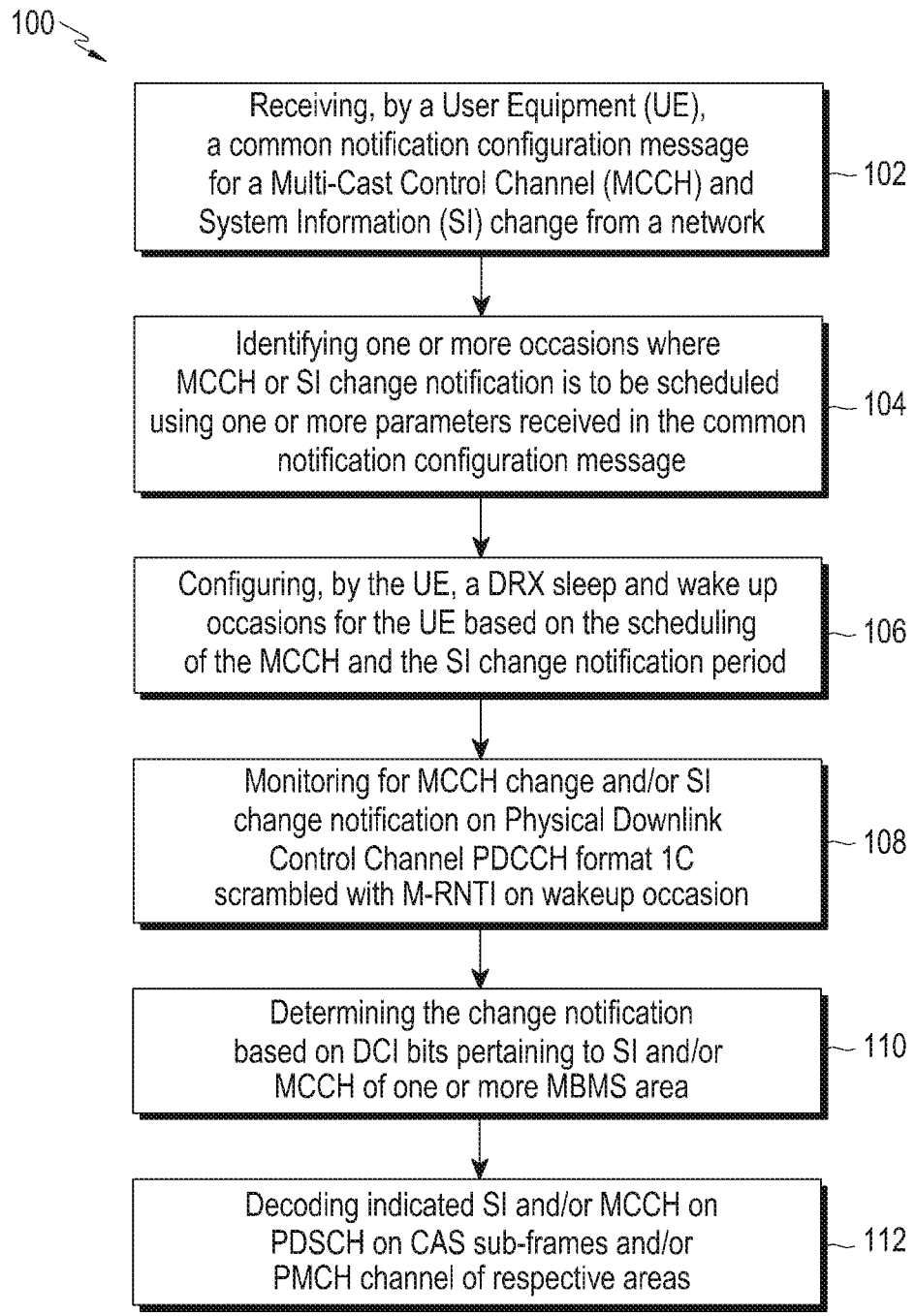
FIG. 1 is a schematic flow diagram illustrating a method for providing multimedia broadcast multicast service (MBMS) operation, according to an embodiment of the present invention.

Although specific features of the present invention are shown in some drawings and not in others, this is done for convenience only as each feature may be combined with any or all of the other features in accordance with the present invention.

DETAILED DESCRIPTION

The present invention provides a system and method for providing multimedia broadcast multicast service (MBMS) operation. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms, including technical and scientific terms, used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein and the various features and advantages details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Figure 2:
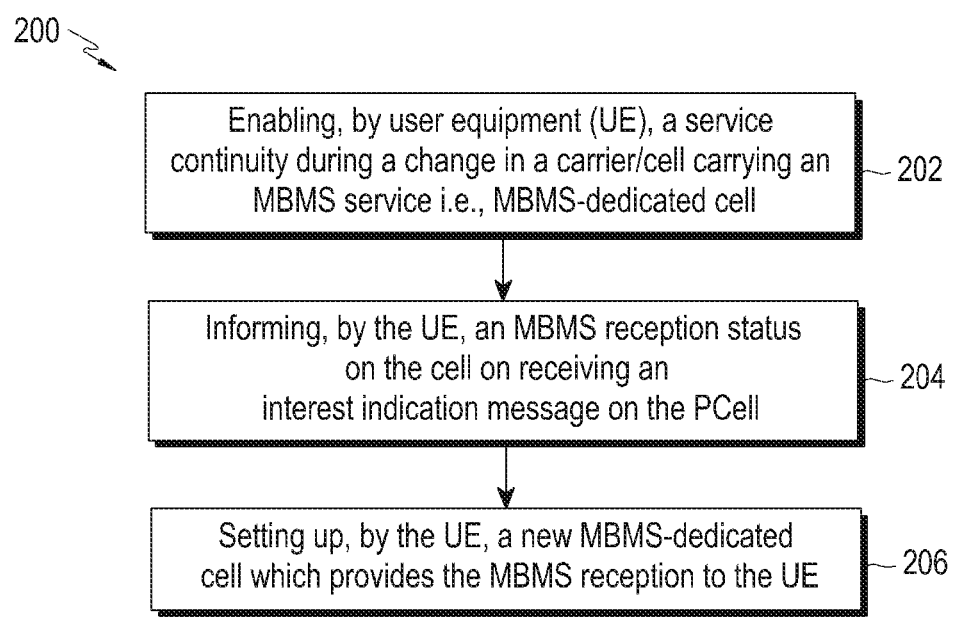
FIG. 2 is a schematic flow diagram illustrating a method for enabling service continuity during multimedia broadcast multicast service (MBMS) operation, according to an embodiment of the present invention.
Figure 3:
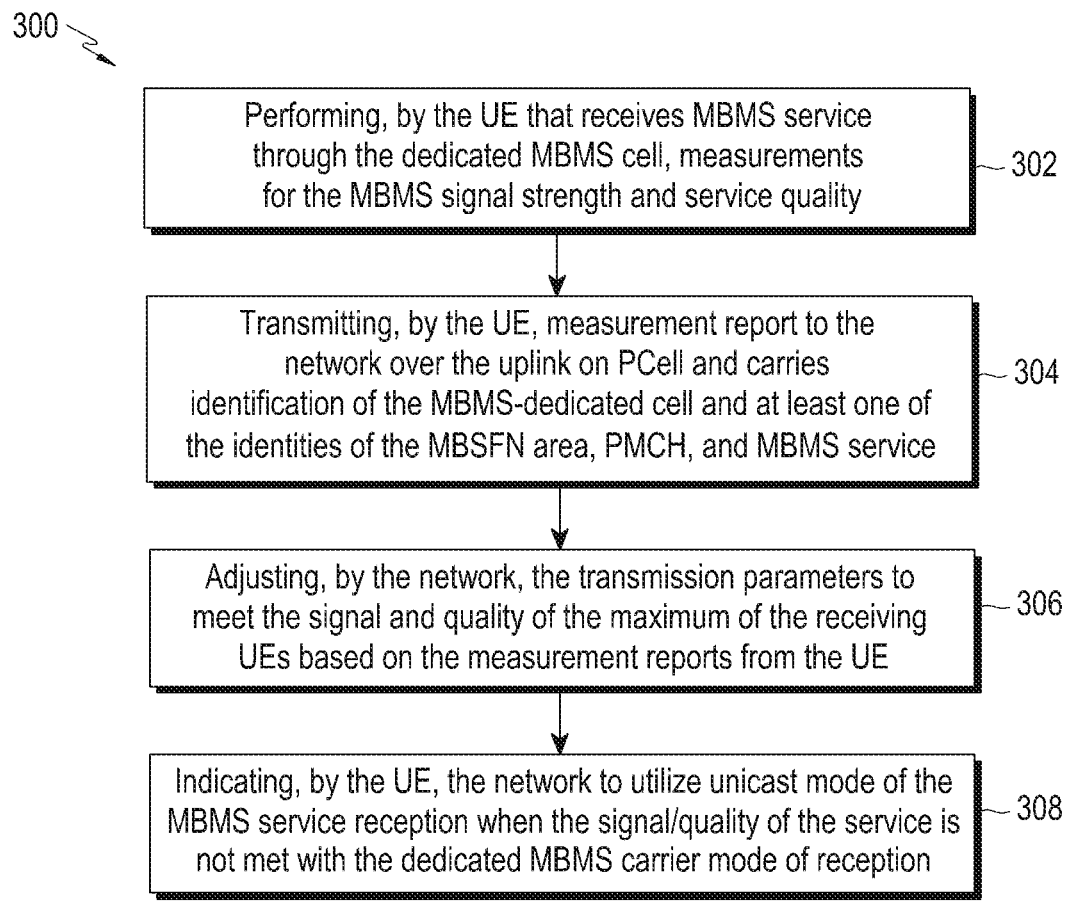
FIG. 3 is a schematic flow diagram illustrating a method for measuring signal strength and service quality during multimedia broadcast multicast service (MBMS) operation, according to an embodiment of the present invention.

FIG. 1 is a schematic flow diagram illustrating a method for providing multimedia broadcast multicast service (MBMS) operation, according to an embodiment of the present invention. FIG. 2 is a schematic flow diagram illustrating a method for enabling service continuity during multimedia broadcast multicast service (MBMS) operation, according to an embodiment of the present invention. FIG. 3 is a schematic flow diagram illustrating a method for measuring signal strength and service quality during multimedia broadcast multicast service (MBMS) operation, according to an embodiment of the present invention.

Referring to FIG. 1, according to an embodiment of the present invention, a system and method for providing multimedia broadcast multicast service (MBMS) operation is described herein. The present invention is described with respect to user equipment (UE, 400) that includes any of the known communication devices, but not limited to, a mobile phone, PDA, tablet, smart watch, smart glasses, and the like, without departing from the scope of the invention.

According to the present invention, the method for providing multimedia broadcast multicast service (MBMS) operation comprises steps of, at step 102, receiving, by a User Equipment (UE, 400), a common notification configuration message for a Multi-Cast Control Channel (MCCH) and System Information (SI) change from a network (540). The network (540) transmits the common notification confirmation message that comprises of MCCH and SI change information. The UE receives the message from the network (540) and identifies the received message as common notification configuration message. In an embodiment of the present invention, the SI Change and MCCH change notification is indicated together through a physical downlink control channel (PDCCH) downlink control information (DCI) Format 1C on non-multicast-broadcast single-frequency network (MBSFN) sub-frame and is decoded by mapping information of a Radio Network Temporary Identifier for MBMS (M-RNTI).

Further, the method comprises of, at step 104, identifying one or more occasions where MCCH or SI change notification is to be scheduled using one or more parameters received in the common notification configuration message. The UE (400) identifies one or more occasions using one or more parameters received in the common notification configuration message where MCCH or SI change notification can be scheduled.

Further, the method comprises of, at step 106, configuring, by the UE, a DRX sleep and wake up occasions for the UE based on the scheduling of the MCCH and the SI change notification period. Based on the scheduling of the MCCH and SI change notification schedule and period, the UE configures the DRX sleep and wake up occasions.

Further, the method comprises of, at step 108, monitoring for MCCH change and/or SI change notification on Physical Downlink Control Channel PDCCH Format 1C scrambled with M-RNTI on wakeup occasion. In an embodiment of the present invention, a new bit is defined for SI change indication and 8 bits for MCCH change indication for 8 different MBSFN areas, wherein the MCCH change notification is provided through one or more reserved sub-frames carrying Physical Downlink Control Channel (PDCCH)/Downlink Control Information (DCI) on dedicated MBMS cell, where the one or more sub-frames comprises at least one of, but not limited to, Master Information Block (MIB), Primary synchronization signals (PSS), Secondary Synchronization Signals (SSS) synchronization signals, System Information Blocks (SIB) information on a dedicated MBMS carrier, and the like, without departing from the scope of the invention.

Further, the method comprises of, at step 110, determining the change notification based on DCI bits pertaining to SI and/or MCCH of one or more MBMS area. Further, the method comprises of, at step 112, decoding indicated SI and/or MCCH on PDSCH on cell acquisition sub-frames (CAS) and/or PMCH channel of respective areas, wherein the CAS can be reserved sub-frames.

In an embodiment of the present invention, the method further comprises of initializing a siModificationPeriod, subject to changes in the MBMS area configurations for the MBMS-dedicated cell, where the siModificationPeriod is derived as a smallest MCCH modification period of all MBMS areas in the MBMS-dedicated cell.

In an embodiment of the present invention, the siModificationPeriod is rf512, wherein rf512 corresponds to 512 radio frames, and rf1024 corresponds to 1024 radio frames, and the like, without departing from the scope of the invention. In another embodiment of the present invention, the siModificationPeriod is a sub-multiple or multiple of MCCH modification period to ensure common occasion of the MCCH information change and system information change notifications in time domain. In another embodiment of the present invention, the siModificationPeriod is implicitly derived as the shortest MCCH modification period in the MBMS-dedicated cell, where the siModification period is subject to changes in the MBMS area configurations for the MBMS-dedicated cell.

In an embodiment of the present invention, the method further comprises of the UE receiving the MCCH information change or system information change notifications on the PDCCH periodically on a CAS, wherein the MCCH information change notification occasions are common for one or more MCCHs that are configured and configurable by one or more parameters included in a systemInformationBlockType13, wherein the one or more parameters included in a SystemInformationBlockType13 comprises of, but not limited to, a repetition coefficient, a radio frame offset, a SI modification period, and the like, and without departing from the scope of the invention.

In another embodiment of the present invention, the common notification occasions are based on the MCCH with a shortest modification period. In another embodiment of the present invention, the shortest modification period corresponds to a lowest value of the MCCH ModificationPeriod of all the MCCHs that are configured.

In an embodiment of the present invention, the MCCH information change or system information change notification is scheduled in radio frames for which an SFN MOD notification repetition period is equal to a notificationOffset, wherein a notificationRepetitionCoefficient indicates a number of repetitions of MCCH change or SI change indication in the modification period.

In an embodiment of the present invention, the parameters notificationRepetitionCoefficient and notificationOffset define a selected CAS that is the System Frame Number (SFN) of the radio frame having CAS sub-frame to carry notification, wherein the notificationOffset is configured as 40 ms or multiples of 40 ms to align with the occurrence of the CAS sub-frame. In another embodiment of the present invention, the MCCH change and SI modification is transmitted in the PDCCH region of the Cell Acquisition Sub-frame (CAS), and CAS sub-frame is fixed as 0. Therefore no indication for the sub-frame is provided in the notification configuration message.

In an embodiment of the present invention, parameters notificationRepetitionCoeff and notificationOffset define selected CAS that is the System Frame Number (SFN) of the radio frame having CAS sub-frame to carry notification as and is given as:

SFN mod notification repetition period=notificationOffset where notification repetition period is derived as shortest MCCH modification period/notificationRepetitionCoeff and notificationOffset is multiple of 4 to indicate the radio frame carrying CAS. A set of values for notificationOffset provides flexibility to network (540) to choose particular CAS sub-frames for notification purpose. In another embodiment of the present invention, notificationOffset can indicate offset in ordinal number of for the CAS sub-frame that is CAS0, CAS1, CAS2, CAS3 . . . so on or 0, 1, 2, 3 . . . so on, instead of indicating absolute number of sub-frames, without departing from the scope of the invention.

In an embodiment, for MBMS-dedicated cell the possible boundaries of modification for system information are defined by SFN values for which SFN mod siModificationPeriod=0. Further, MCCH modification period used is either fixed to rf512 or rf1024 for MBMS-dedicated cell and is indicated in the system information message. However, for the case of system information modification period, the present invention provides different approaches for configuring a particular duration value and providing it to the UE.

To facilitate better operation, especially for higher bandwidth radio cells such as, but not limited to, 5, 10, 15 and 20 MHz, and the like where more DCI bits are available, more DCI bits are allocated to indicate the change of specific SIB. For instance, 1 bit can be allocated for change of SIB1-MBMS, 1 bit can be allocated for SI-MBMS and so on. Also a possible extension, some DCI bits are used to indicate the change/update of, but not limited to, Earthquake Tsunami Warning System (ETWS), Commercial Mobile Alert System (CMAS), Extended Access Barring (EAB) messages and other information messages, without departing from the scope of the invention, as they can be indicated at any point of time due to urgency of the need.

In some cases, where the cell bandwidth is smaller and provide less number of DCI bits, the DCI bits can be indicated together by combining into a common bit or a few common bits. In this case, a change indicated is therefore common to these information elements and the UE is required to decode for all these messages to identify the actual change. However, when none of these information elements are changed or updated, the UE is able to identify that no change has happened and there decoding of the messages is avoided. This provides for lesser wake-up needs and reduced power consumption performance. Therefore, indication bit can be used for indicating change in at least one or more information elements from SIB10 (ETWS primary notification), SIB11 (ETWS secondary notification), SIB12 (CMAS notification), SIB13 (MBMS area configuration information), SIB14 (Extended Access Barring parameters), SIB15 (MBMS Service Area identities of current and/or neighboring frequencies), SIB16 (timing information), SIB20 (SCPTM related information).

In another embodiment of the present invention, a different format of DCI such as, but not limited to, direct indication signaling and the like is used to convey ETWS, CMAS, EAB and the like related information change notifications. In order to save power consumption and to provide same wake up occasions for the UE, the scheduling of this new DCI (direct indication signaling) is done at same occasions as the DCI for System information change and/or MCCH information change notifications. Since some of this information may be of emergency or urgent in nature, therefore, there may be possibility to repeat them more times other than the common occasions as well.

In an embodiment of the present invention, for system bandwidth of 1.4 MHz, the UE ignores the notification configuration for MCCH change notification, but utilizes notification configuration to receive corresponding DCI bit for system information change. In this case, DCI on PDCCH carries only the system information change notification for the MBMS dedicated cell.

System bandwidth of the radio cell can vary from 1.4 MHz to up to 20 MHz and possible higher. Therefore amount of system information that can be carried in transmission resource (e.g. sub-frame of 1 ms) may vary. In order to target this aspect, the following approaches are provided to deliver system information in the MBMS-dedicated cell.

In one of the embodiment, the flexible arrangement of the system information is performed across multiple system information blocks dynamically to meet the available transmission resource. Embedded indication in the message itself helps to distinguish the presences of different system information blocks. On parsing the received message, the UE gets aware about the received system information blocks. This is especially useful as different system information may be of different sized and best fitting the ones or combination of them for the current system bandwidth helps in the efficient transmission.

In an embodiment of the present invention, in order to provide multiple system information block together in the same sub-frame using different RNTIs (Physical layer identifiers) for these messages which help in distinguishing and decoding separately.

In another embodiment of the present invention, segmentation for the system information is allowed. To help UE to reassemble the system information received across different sub-frames, indications are provided in the message itself whether it is the continuing or terminating part of the system information message and/or the part number. Due to dynamic size of the system information owing to the possibilities of different number of MBMS services and associated configurations in the system information, it may or may not be feasible to always fit the system information in the available transmission resource or system bandwidth applicable for the cell and segmentation approach provides flexibility to suitably adjust and break into parts and deliver the message.

In an embodiment of the present invention, the method dynamically configures transmission resources based on the cell bandwidth or the message size due to the number services and configurations present by indicating more number of non-MBSFN sub-frames that can be used by the network to send the system information. To achieve this, an indication is included in Master Information Block (MIB) about the number of non-MBSFN sub-frames available in the cell following the CAS sub-frame.

In an embodiment of the present invention, the first sub-frame that UE is availing for system information also indicates whether further sub-frames carries more system information and UE needs to continue decoding.

In another embodiment of the present invention, the method discloses providing least possible latency in the delivering system information when all system information is delivered in adjacent sub-frames. This will enable the UE to be ready to operate and avail MBMS services very quickly and delay associated to first acquiring system information at their respective occasions can be avoided and MBMS services can be started very quickly. Another benefit is that the UE is not required to wake up at different occasions to avail system information. For this purpose, the present method provides SIB1-MBMS and other SIs in the consecutive and adjacent sub-frames as indicated in the MIB.

In another embodiment of the present invention, the UE indicates its capability and support for FeMBMS in UE capability information message and/or interest indication message in the uplink on the serving cell. This facilitates the network with the knowledge of UE capabilities and accordingly performing service continuity e.g. mobility transitions of the UE considering the possibility of the FeMBMS service reception for the UE, i.e., MBMS service reception from the dedicated MBMS cell.

Referring to FIG. 2, in another embodiment of the present invention, the method further comprises of the UE (400), at step 202, enabling a service continuity during a change in a carrier/cell carrying an MBMS service (MBMS-dedicated cell); wherein the change in MBMS-dedicated cell is due to at least one of, but not limited to, mobility, service unavailability, service signal strength declining below a threshold level or mobility of the UE, and the like. Further, the method comprises of, at step 204, informing by the UE, an MBMS reception status on the MBMS-dedicated cell on receiving an interest indication message on the PCell. Further, the method comprises of the UE, at step 206, setting up a new MBMS-dedicated cell which provides the MBMS reception to the UE, wherein the UE receiving MBMS service through the dedicated MBMS carrier performs measurements for the MBMS signal strength and service quality.

In one of the embodiment of the present invention, switching is done between dedicated MBMS carrier mode to receiving service through unicast mode and vice versa. This switching can be the result of one of the criterions that include, but not limited to, loading situation for the cell (carrier), service suspension, battery power status at UE, cost of the service involved, signal strength degradation on the concerned carrier, mobility of the UE, and the like, without departing from the scope of the invention. The switching can be initiated by the UE or network. In either case, an indication is passed to other entity before switching is performed and possibly, sufficiently prior intimation is given to ensure the new connection is established and service reception starts before the service reception is broken on previous link/carrier.

In one of the embodiment of the present invention, cell selection is performed on the basis of the support for MBMS service "receive only mode" is supported on the target cell. This is particularly significant for the broadcast only device e.g. television devices that would be receiving MBMS TV services in downlink only and has no uplink capability. These devices need to be camped to standalone MBMS carrier to receive MBMS services. One of the approaches to identify receive only mode support on the cell (carrier) is through explicit indication of "receive only mode support" broadcasted in the system information. Other approach is by attempting decoding MIB/PSS/SSS on the carrier and interpretation of successful decode as identification of MBMS carrier and thereby support for "receive only mode".

In an embodiment of the present invention, methods for idle mode mobility and service continuity can include, but not limited to:

While camped on serving cell and receiving eMBMS Service from dedicated MBMS carrier UE should not treat dedicated MBMS carrier for candidate cell for re-selection. Instead, the UE should treat serving cell's EARFCN as highest priority frequency.

While camped on serving cell and receiving eMBMS Service from dedicated MBMS carrier, if serving cell's signal strength goes below threshold and triggers reselection to another new cell, the UE, after reselecting to new cell, can autonomously decide to continue availing MBMS service from dedicated MBMS carrier.

While camped on serving cell and receiving eMBMS Service from dedicated MBMS carrier, if dedicated MBMS carrier signal strength goes below certain threshold and UE triggers search for another carrier that supports that provides interested service.

In one of the embodiment of the present invention, transition from dedicated MBMS carrier to standalone MBMS carrier is performed. It is undertaken when unicast service is stopped or the UE is no longer interested in pursuing unicast communication for reasons such as, but not limited to, due to power limitation, cost involved, desires to receive only MBMS service, and the like, without departing from the scope of the invention. The UE sends an indication to the network (540) on PCell uplink indicating the same. This indication can be Interest indication message or a different type of indication. Based on this indication network (540) releases the Scell and RRC connection with the UE. It possibly includes informing the UEs EUTRA Absolute radio-frequency channel number (EARFCN) and other standalone MBMS carrier information. The UE transitions to idle mode and continue availing the MBMS service from the standalone carrier. In some cases, the standalone carrier can be the same carrier which was being used as dedicated MBMS carrier by the UE in connected mode. While receiving MBMS service on the standalone carrier through one of the RF (Radio Frequency) by the UE, the UE maintains the idle state on the serving cell (PCell) to monitor paging messages and/or system information. Paging information is monitored to be able to detect any incoming call or change in system parameters on the PCell.

Referring to FIG. 3, in an embodiment of the present invention, at step 302, UE receiving MBMS service through the dedicated MBMS carrier (SCell) performs measurements for the MBMS signal strength and service quality. This measurement is reported periodically and/or at event basis e.g. when measurement value drops below or exceeds a configured threshold value.

In an embodiment of the present invention, at step 304, the measurement report is transmitted on the uplink on PCell and carries identification of the MBMS-dedicated cell and at least one of the identities of, but not limited to, the MBSFN area, PMCH, MBMS service, and the like. In another embodiment of the present invention, at step 306, the Network (540) from UEs adjusts the transmission parameters to meet the signal and quality of the maximum of the receiving UEs based on the measurement reports from the UE. In another embodiment of the present invention, at step 308, the UE can also indicate to utilize unicast mode of the MBMS service reception when the signal/quality of the service is not met with the dedicated MBMS carrier mode of reception.

FIG. 1 is a schematic flow diagram 100 illustrating a method for providing multimedia broadcast multicast service (MBMS) operation, according to an embodiment of the present invention. According to flow diagram 100, at step 102, a User Equipment (UE, 400) receives a common notification configuration message for a Multi-Cast Control Channel (MCCH) and System Information (SI) change from a network (540). At step 104, one or more occasions are identified where MCCH or SI change notification is to be scheduled using one or more parameters received in the common notification configuration message.

Further, at step 106, the UE configures a DRX sleep and wake up occasions for the UE based on the scheduling of the MCCH and the SI change notification period. Further, at step 108, MCCH change and/or SI change notification are monitored on Physical Downlink Control Channel (PDCCH) Format 1C scrambled with M-RNTI on wakeup occasion. Further, at step 110, the change notifications are determined based on DCI bits pertaining to SI and/or MCCH of one or more MBMS area. Further at step 112, indicated SI and/or MCCH on PDSCH are decoded on CAS sub-frames and/or PMCH channel of respective areas.

FIG. 2 is a schematic flow diagram 200 illustrating a method for enabling service continuity during multimedia broadcast multicast service (MBMS) operation, according to an embodiment of the present invention. According to the flow diagram 200, at step 202, the UE enables a service continuity during a change in a carrier/cell carrying an MBMS service i.e., MBMS-dedicated cell. Here, the change in carrier/cell is due to at least one of, but not limited to, mobility, service unavailability, service signal strength declining below a threshold level, mobility of the UE, and the like, without departing from the scope of the invention. Further at step 204, the UE informs an MBMS reception status on the cell on receiving an interest indication message on the PCell. Further, at step 206, the UE sets up a new MBMS-dedicated cell which provides the MBMS reception to the UE.

FIG. 3 is a schematic flow diagram 300 illustrating a method for measuring signal strength and service quality during multimedia broadcast multicast service (MBMS) operation, according to an embodiment of the present invention. According to the flow diagram 300, at step 302, the UE that receives MBMS service through the dedicated MBMS cell, performs measurements for the MBMS signal strength and service quality. Further at step 304, the UE transmits the signal strength and service quality measurement report to the network (540) over the uplink on PCell and carries identification of the MBMS-dedicated cell and at least one of the identities of, but not limited to, the MBSFN area, PMCH, MBMS service, and the like, without departing from the scope of the invention. Further, at step 306, the network (540) adjusts the transmission parameters to meet the signal and quality of the maximum of the receiving UEs based on the measurement reports from the UE. Further at step 308, the UE indicates the network (540) to utilize unicast mode of the MBMS service reception when the signal/quality of the service is not met with the dedicated MBMS carrier mode of reception.

Figure 4:
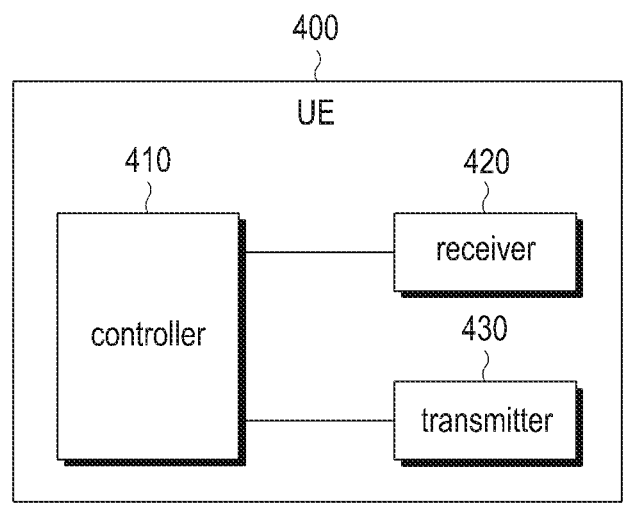
FIG. 4 illustrates an example of a UE according to an embodiment of the present invention.

FIG. 4 illustrates an example of a UE according to an embodiment of the present invention. Referring to FIG. 4, a user equipment (UE, 400), for providing multimedia broadcast multicast service (MBMS) operation, comprises at least one of a receiver (420) configured to receive a signal from the network; a transmitter (430) configured to transmit a signal to the network; or a controller (410) configured to control the receiver (420) and the transmitter (430).

In one of the embodiment of the present invention provides wherein the controller (410) is configured to adapt for: receiving a common notification configuration message for a Multi-Cast Control Channel (MCCH) and System Information (SI) change from a network; identifying one or more occasions where MCCH or SI change notification is to be scheduled using one or more parameters received in the common notification configuration message; configuring a DRX sleep and wake up occasions for the UE based on the scheduling of the MCCH and the SI change notification period; monitoring for MCCH change and/or SI change notification on Physical Downlink Control Channel PDCCH Format 1C scrambled with M-RNTI on wakeup occasion; determining the change notification based on DCI bits pertaining to SI and/or MCCH of one or more MBMS area; and decoding indicated SI and/or MCCH on PDSCH on CAS sub-frames and/or PMCH channel of respective areas.

Figure 5:
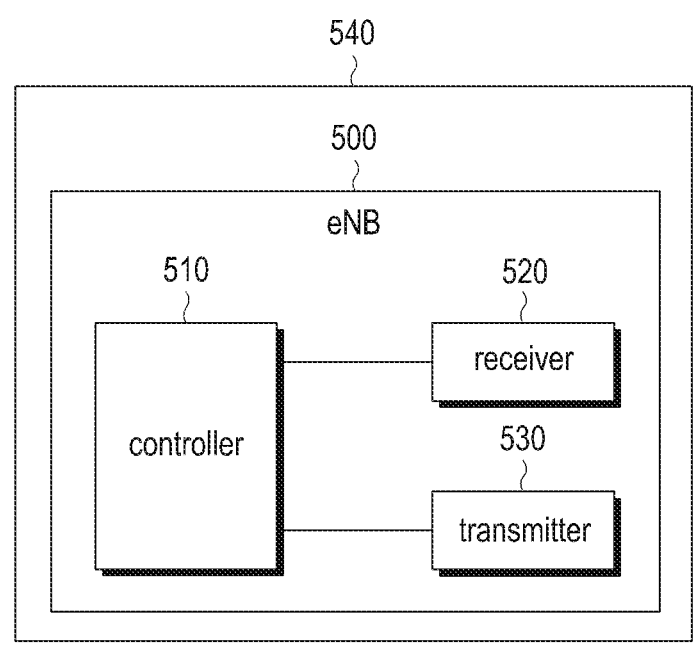
FIG. 5 illustrates an example of a network and a eNB (or a base station (BS)) according to an embodiment of the present invention.

FIG. 5 illustrates an example of a network and a eNB (or a base station (BS)) according to an embodiment of the present invention. Referring to FIG. 5, the network (540) for providing multimedia broadcast multicast service (MBMS) operation comprises a eNB (500, or a base station (BS)), wherein the eNB (500) comprises at least one of a receiver (520) configured to receive a signal from the UE; a transmitter (530) configured to transmit a signal to the UE; or a controller (510) configured to control the receiver (520) and the transmitter (530).

The above-described operations may be realized by equipping a memory device retaining their corresponding codes in an entity, base station, or any component of a UE equipment in a communication system. That is, the controller in the entity, the base station, or the UE equipment may execute the above-described operations by reading and executing the program codes stored in the memory device by a processor or central processing unit (CPU).

The present invention provides a system and method for enabling Multimedia Broadcast Multicast Service (MBMS) counting. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

According to an embodiment of the present invention, a method for multimedia broadcast multicast service (MBMS) counting operation, the method comprises receiving, by an user equipment (UE), an MBMS counting request from a wireless communication network; sending, by the UE, an MBMS counting response message on a dedicated path to the network, if the UE is in connected mode; and triggering, by the UE, a random access channel (RACH) procedure for sending the MBMS counting response message, if the UE is in idle mode.

Further, the method comprises of evaluating, by the UE, a signal condition for sending the MBMS counting response message, and wherein evaluating the signal condition comprises of comparing by the UE, the signal condition of a present signal with a preset threshold parameter received from the network; sending, by the UE, the MBMS counting response message to the network if the evaluated signal condition is more than the preset threshold parameter.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released immediately after the network receives the MBMS counting response message, if the RRC connection is established only for the MBMS counting.

In an embodiment of the present invention, wherein the UE sets a radio resource control (RRC) connection request cause either as mobile originated (MO)-data or combined MO data-MBMS counting, depending on requirement of the UE to initiate a RRC connection, and wherein the RRC connection is released based on a data inactivity period, if the RRC connection is established not only for MBMS counting.

In an embodiment of the present invention, wherein the UE triggers the RACH procedure by sending a preamble set to indicate the network that the UE has enough buffer size accumulated for a Msg3 and is therefore allocated with a larger msg3 grant; and a MAC control element (CE) to indicate the network purpose of the RACH procedure is to send MBMS counting response message.

In an embodiment of the present invention, wherein the UE triggers the RACH procedure by sending a preamble set to indicate the network that the UE has enough buffer size accumulated for a msg3 and is therefore allocated with a larger msg3 grant; and accommodating MBMS counting response message in allocated grant for Msg3.

Further, the method comprises of terminating the MBMS counting on receiving a HARQ Ack from the network, which indicates a successful transmission of the msg3 is completed.

In an embodiment of the present invention, wherein the UE triggers the RACH procedure for sending the MBMS counting response message if the UE fulfill conditions for path-loss and msg3 buffer size.

Further, the method comprises of performing by the UE if the UE is in the idle mode, a probabilistic estimation on whether to participate in the MBMS counting operation; and wherein a probability factor which determines chances of participation for the UE is provided by at least one of indicating the probability factor in the MBMS counting request by the network based on current loading and/or previous statistic of a counting operation; and preconfigured or signaled as part of MBMS system or control information with at least one of possible values for the probability factor.

In an embodiment of the present invention, wherein the UE selects a time occasion to trigger the RACH procedure base on the probabilistic estimation.

In an embodiment of the present invention, wherein an identity field is provided in the MBMS counting response message for distinguishing different responses messages with respect to an originating PCell and/or PLMN.

In an embodiment of the present invention, wherein an identity field, which indicates MBMS counting procedure release version, is provided in the MBMS counting response message for distinguishing different counting response messages with respect to parallel or multiple counting request procedures corresponding to different release versions.

According to an embodiment of the present invention, a user equipment (UE) for operating multimedia broadcast multicast service (MBMS) counting, the UE is configured to receives an MBMS counting request from a wireless communication network; sends an MBMS counting response message on a dedicated path to the network, if the UE is in connected mode; and triggers a random access channel (RACH) procedure for sending the MBMS counting response message to the network, if the UE is in idle mode.

In an embodiment of the present invention, wherein the UE sets a radio resource control (RRC) connection request cause either as mobile originated (MO)-data or combined MO data-MBMS counting, depending on requirement of the UE to initiate a RRC connection.

According to an embodiment of the present invention, a system and method for enabling Multimedia Broadcast Multicast Service (MBMS) counting is described herein. The present invention is described with respect to user equipment (UE) that includes any of the known communication devices, but not limited to, a mobile phone, PDA, tablet, TV, smart watch, smart glasses, and the like, without departing from the scope of the invention.

According to the present invention, the method comprises steps of receiving, by User Equipment (UE), an MBMS counting request from a wireless communication network. The network wishes to identify the count of devices/user equipments (UEs) that are availing or interested to receive certain MBMS services from the network and thus transmits MBMS counting request message to the UE. The UE receives the MBMS counting request from the wireless communication network. In an embodiment of the present invention, one or more UEs that are connected to the network receive the MBMS counting request from the network, wherein they are capable of receiving MBMS transmission from the network whether they are in idle state or connected state. In another embodiment of the present invention, all the UEs connected to the network receive the MBMS counting request from the network.

Further, the method comprises of evaluating, by the UE, a signal condition for sending MBMS counting response. Upon receiving the MBMS counting request from the wireless communication network, the UE attempts to transmit MBMS counting response to the wireless communication network, and thus evaluates the signal condition for sending the MBMS counting response. In an embodiment of the present invention, one or more UEs connected to the network evaluate the signal condition for sending the MBMS counting response. The threshold for the signal condition is either preconfigured or explicitly configured by the network. The threshold parameter can be provided in the MBMS configuration message and/or along with counting request message by the network. UE therefore compares the perceived signal conditions with the threshold and if signal conditions are found better than threshold, pursue the sending of the MBMS Counting Response message; otherwise, sending is not undertaken.

Further, the method comprises of sending, by one or more connected mode UEs, an MBMS counting response on a dedicated path to the network. One or more UEs, which are in connected mode, transmits MBMS counting response to the network on the dedicated path.

Further, the method comprises of triggering, by one or more Idle mode UEs, a RACH procedure for sending the MBMS counting response. As the one or more UEs which are in connected mode has already transmitted MBMS counting response to the network, the network will be expecting response from one or more idle mode UEs. The one or more idle mode UEs triggers RACH procedure for sending the MBMS counting response.

In an embodiment of the present invention, an identity field is provided in the counting response message from the UE for distinguishing different responses messages with respect to an originating PCell and/or PLMN. Since the MBMS reception is on a common MBMS network/PLMN which is shared among users of the different networks/PLMNs, in order to distinguish the serving cell (PCell) and/or PLMN of the particular UE, identity field(s) help in distinguishing the originating PCell and/or PLMN. This facilitates to determine the distribution of the MBMS users of different MBMs services across different cells and/or PLMNs.

In an embodiment of the present invention, the one or more idle UEs triggers the RACH procedure by sending at least one of, but not limited to, a preamble set to indicate the network that the UE has more buffer size accumulated for a Msg3 and is therefore allocated with a larger msg3 grant to carry a MAC Control Element (CE) to indicate the network the trigger of the RACH procedure and/or accommodating the MBMS Counting Response message, and the like, without departing from the scope of the invention. In an embodiment of the present invention, the one or more idle mode UEs triggers the RACH procedure for sending the MBMS counting response only when the one or more idle mode UEs fulfill the conditions for the path-loss and the msg3 buffer size.

In another embodiment of the present invention, one or more UEs triggering the RACH procedure further comprises of terminating the MBMS counting on receiving a HARQ ACK from the network, when a successful transmission of the msg3 is completed.

Further, the method comprises of setting, by the UE, a Radio Resource Control (RRC) connection request cause depending on the request reason set either as mobile originated (MO)-data or combined MO data-MBMS Counting depending on the UEs requirements to initiate the RRC connection.

In an embodiment of the present invention, the method further comprises of checking if the RRC connection is established for the MBMS Counting purpose. If yes, then the network releases the RRC connection immediately after the reception of the MBMS counting response. If the RRC connection is established for any other reason including general MO-data, then the network releases the RRC connection based on a data inactivity period.

In another embodiment of the present invention, the method further comprises of performing by the one or more idle UEs, a probabilistic estimation on whether to participate in the counting operation, wherein a probability factor which determines the chances of participation for each UE is provided by at least one of, but not limited to, indicating the probability factor in the counting request message by the network based on current loading and/or previous statistics of a counting operation, and preconfigured or signaled as part of MBMS system or control information with at least one of the possible values for the probability factor, without departing from the scope of the invention. In an embodiment of the present invention, the probabilistic estimation enables the UE to select the time occasion to trigger the RACH operation in order to send the counting response message.

Figure 6:
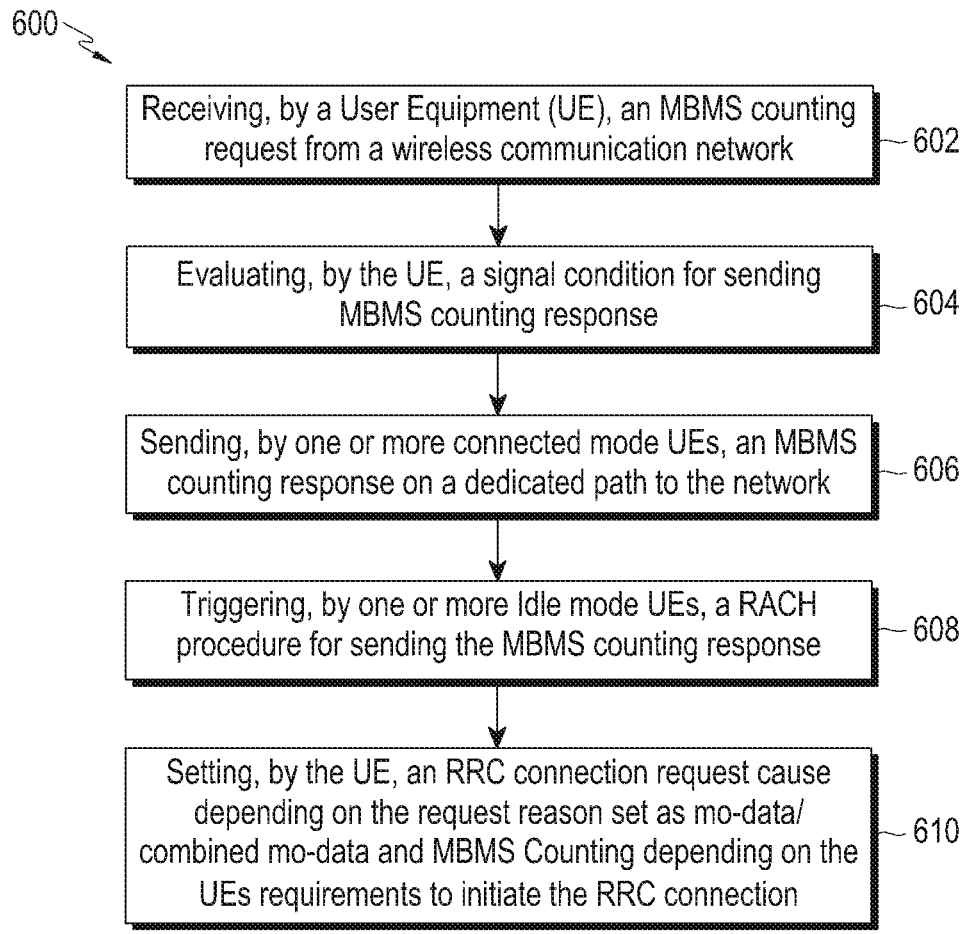
FIG. 6 is a schematic flow diagram illustrating a method for enabling Multimedia Broadcast Multicast Service (MBMS) counting, according to an embodiment of the present invention.

FIG. 6 is a schematic flow diagram 600 illustrating a method for enabling Multimedia Broadcast Multicast Service (MBMS) counting, according to an embodiment of the present invention. According to the flow diagram 600, at step 602, user equipment (UE) receives an MBMS counting request from a wireless communication network. Further, at step 604, the UE evaluates a signal condition for sending MBMS counting response.

Further, at step 606, one or more UEs in connected mode send a MBMS counting response on a dedicated path to the network. Further, at step 608, one or more UEs in Idle mode trigger a RACH procedure for sending the MBMS counting response. Further, at step 610, the UE sets an RRC connection request cause depending on request reason set either as mobile originated (MO)-data or combined MO-data and MBMS Counting, depending on the UEs requirements to initiate the RRC connection, if there is an established RRC connection.

Figure 7:
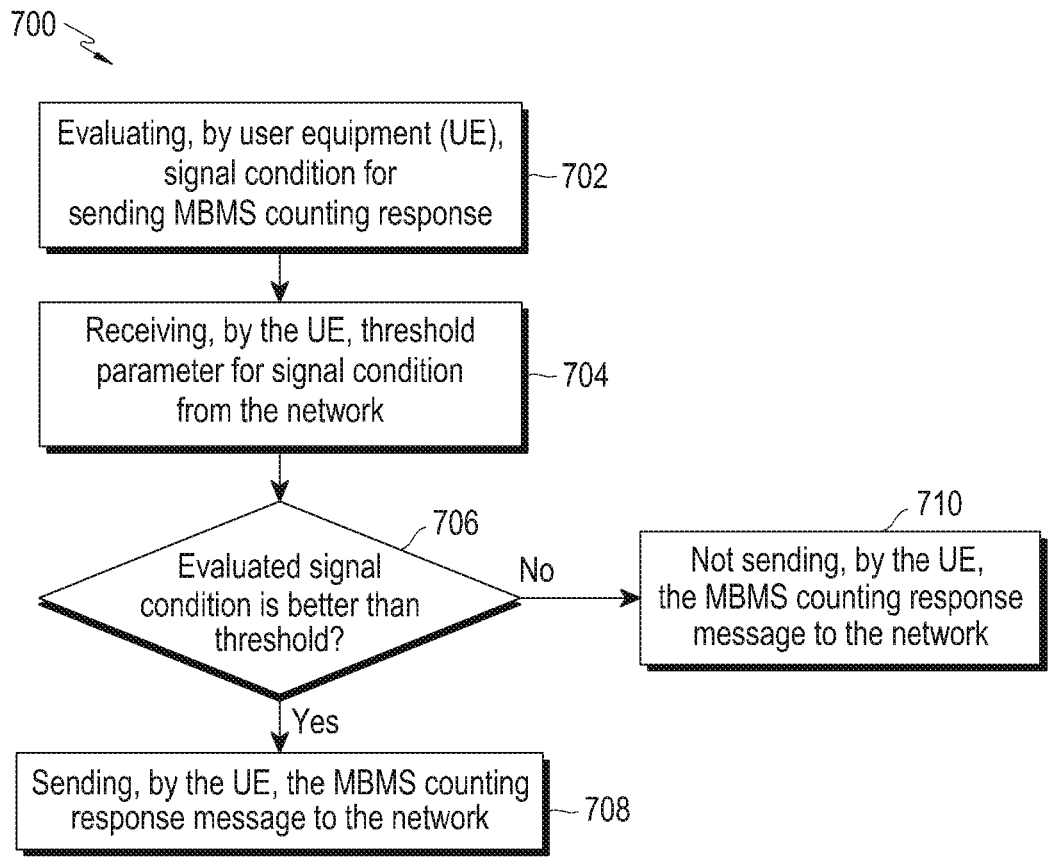
FIG. 7 is a schematic flow chart illustrating a method for evaluating signal condition for sending MBMS counting response, according to an embodiment of the present invention.

FIG. 7 is a schematic flow chart 700 illustrating a method for evaluating signal condition for sending MBMS counting response, according to an embodiment of the present invention. User equipment (UE) performs evaluation of the signal condition to check whether MBMS counting response can be transmitted to a network or not. According to FIG. 7, at step 702, the UE evaluates the signal condition for sending MBMS counting response. Further at step 704, the UE receives threshold parameter for signal condition. In an embodiment of the present invention, the threshold for the signal condition can be either preconfigured or explicitly configured by the network, without departing from the scope of the invention. In another embodiment of the present invention, threshold parameter can be provided in the MBMS configuration message and/or along with counting request message by the network, without departing from the scope of the invention.

Further, at step 706, the UE checks whether evaluated signal condition is better than threshold parameter. If yes, then at step 708, the UE sends the MBMS counting response message. If not, then at step 710 the UE does not send the MBMS counting response message to the network.

The counting mechanism can be useful for TV broadcast services. The present invention addresses the issues involved with counting in new system and provides new solutions. In an embodiment of the present invention, UEs, which are in connected mode, receive counting request on dedicated MBMS carrier, receive MBMS through dedicated eMBMS carrier (SCell), and send counting response messages through PCell uplink. In another embodiment of the present invention, UEs which are in idle mode and that are having single receiver, receive service through standalone MBMS carrier, and are sparred from sending response in uplink. These UEs can send counting response through some other mechanism if they are equipped with, for instance, TV devices, having internet connectivity, and send out the responses utilizing HTTP links and so on. With the present method, the scope of receiving counting responses at the network is widened.

Figure 8:
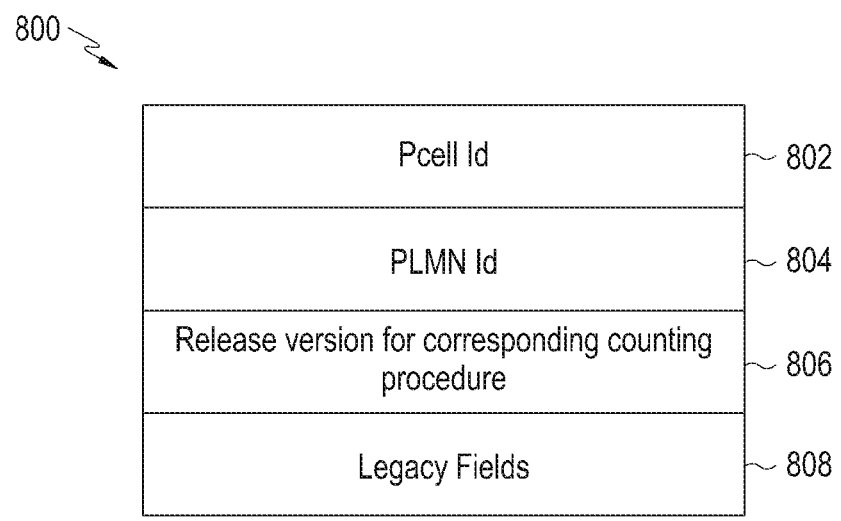
FIG. 8 is a schematic diagram illustrating message format for MBMS counting response message, according to an embodiment of the present invention.

FIG. 8 is a schematic diagram 800 illustrating message format for MBMS counting response message, according to an embodiment of the present invention. According to the FIG. 8, the MBMS counting response message comprises at least one of primary cell identifier (PCell Id) 802, PLMN identifier (PLMN Id) 804, release version for corresponding counting procedure 806, and one or more legacy fields 808. The person having ordinarily skilled in the art can understand that the one or more legacy fields 808 can include at least one of the fields which were transmitted by the UE to the network in legacy system, without departing from the scope of the invention.

In another embodiment of the present invention, it is considered that the idle mode UEs with dual RF receiver capability are involved in counting procedure to get a more accurate picture of service usage, and thereby resultant service provisioning can be enabled by the network. Further, the present method also monitors state transitions and power consumption while device is being asked for counting details. For example, if the UE battery is limited, then it can be allowed to not to respond with counting response. When the device is in idle mode, it triggers, a connection establishment by triggering an Initial Random Access Channel (RACH) procedure in order to send counting response.

In another embodiment of the present invention, as establishing RRC connection by a large number of idle mode UEs in order to send counting response messages will cause congestion or loading to the network, the present method provides a connection-less signaling approach for sending counting response message. In this approach, counting response message is sent as part of the msg3 of the RACH procedure. The person having ordinarily skilled in the art understands the structure of RACH procedure, msg3, and thus not described herein.

When successful transmission of msg3 is completed, which is interpreted from the HARQ ACK of the msg3 reception from the network, the procedure is concluded. That is, no further message or operation or establishing the RRC connection is pursued, no RRC connection setup message transmission from the network is pursued. The UE remains in the idle mode and RACH procedure is considered as terminated. The objective of sending counting response message is therefore achieved without establishing the connection. In order to ensure that the UE is provided sufficient allocation size for the msg3 grant, it is required that the network is signaled about this. This is accomplished by a number of different ways: (a) UE chooses the preamble set such that the network gets informed by this choice of preamble set that the UE has more buffer (message size) accumulated for the Msg3 and is therefore allocated with larger msg3 grant. (b) a special preamble id is reserved for idle mode UEs to do RACH for the purpose MBMS counting response. This facilitates the network to know the purpose of the RACH and allocates sufficient size for the MSg3 grant. (c) Only those UEs which fulfill the conditions for the path-loss and msg3 buffer size considers doing RACH for the purpose of sending of counting response. Other UEs which do not fulfill these conditions do not undertake RACH. This results in to autonomously selection of the preamble set which provides for bigger allocation for msg3 grant.

Figure 9:
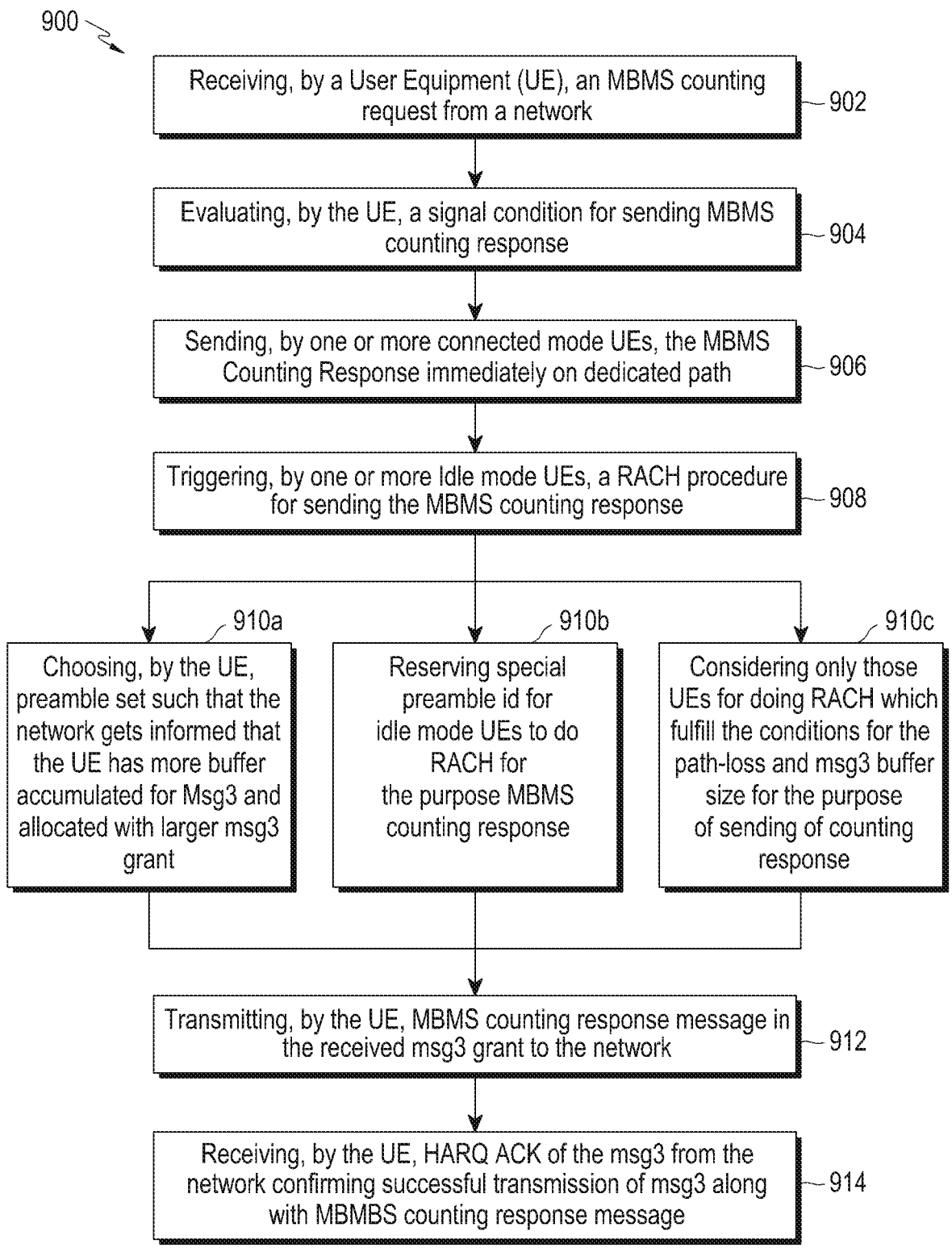
FIG. 9 is a schematic flow diagram illustrating a method for transmitting MBMS counting response message as part of random access channel (RACH) procedure, according to an embodiment of the present invention.

FIG. 9 is a schematic flow diagram 900 illustrating a method for transmitting MBMS counting response message as part of random access channel (RACH) procedure, according to an embodiment of the present invention. According to the FIG. 9, at step 902, User equipment (UE) receives MBMS Counting Request from network. At step 904, the UE evaluates the condition for sending MBMS Counting Response. At step 906, UEs, which are in connected mode send the MBMS Counting Response immediately on dedicated path. At step 908, UEs, which are in idle mode trigger the RACH procedures in order to send the MBMS Counting response.

Further, at step 910, to send RACH procedure, the UE chooses one of the following:

At step 910*a*, the UE chooses the preamble set such that the network gets informed by this choice of preamble set that the UE has more buffer of message size accumulated for Msg3 and is therefore allocated with larger msg3 grant.

At step 910*b*, a special preamble id is reserved for idle mode UEs to do RACH for the purpose MBMS counting response. This facilitates the network to know the purpose of the RACH and allocates sufficient size for the MSg3 grant.

At step 910c, only those UEs which fulfill the conditions for the path-loss and msg3 buffer size considers doing RACH for the purpose of sending of counting response.

At step 912, the UE transmits MBMS counting response message in the received msg3 grant to the network. At step 914, the UE receives HARQ ACK of the received msg3 grant from the network confirming successful transmission of msg3, and thus successful transmission of MBMBS counting response message to the network from the UE.

Further, according to the present invention, the present system and method performs probabilistic estimation, according to an embodiment of the present invention. Since the number of the idle mode UEs may be large, the resultant RACH overload could be very high leading to network congestion and impact to the other UEs which are attempting RACH for other purposes. To overcome this, according to the present invention, the network can perform probabilistic estimation of the UEs availing the MBMS services from the limited sample or a subset of the total UEs.

Using limited sample or a subset of the total UEs, network scales the number of UEs to estimate the actual number of users for the respective services. For this purpose, each of the idle mode UEs can do some probability based decision whether to participate in the counting operation and consequently, only a limited number of the UEs actually participate, further limiting RACH load. The probability factor which determines the chances of participation for each UE is provided by at least one of the different ways as listed as:

Indication of probability factor in counting request message by network based on current loading and/or previous statistic of counting operation.

Preconfigured or signaled as part of MBMS system or control information with at least one of the possible values for the probability factor.

According to probabilistic approach, number of the UEs participating in RACH operation and therefore the RACH access load can be controlled. As an alternative approach, this is also achieved by making the UEs attempt RACH at different time occasions. For this purpose, the probability approach is used for each of the UE to select the time occasion to do RACH operation in order to send counting response message.

In another embodiment of the present invention, combination of both the approaches for probabilistic estimation for limited number of UEs doing RACH and doing RACH over different time occasions is applied. This leads to significant reduction in the RACH overload.

In another embodiment of the present invention, the present method provides a mechanism to accumulate, distinguish and process the Counting Responses received via different PCells, wherein the Pcells are different belonging to different PLMNs/Operators. Also, co-ordination is needed across multiple networks to route responses properly and unambiguously on the new interfaces to the entity handling Counting Responses. Since 3GPP is coming up with several architecture solutions involving different arrangement of the network entities and interfaces, thereby requiring suitable handling, identification and routing of counting messages. The present invention provides an identify field within the counting response message which helps distinguishing the different responses messages with respect to its originating PCell and/or PLMN etc.

Furthermore, there may be complexity involved due to conflict in legacy counting procedure of the individual PLMNs's own legacy eMBMS with the new counting procedure on shared eMBMS network. That is there can be a mixed deployment scenario. An identification, for which counting procedures with respect to legacy or new, the concerned Counting response pertains to, is indicated in counting response message.

Figure 10A:
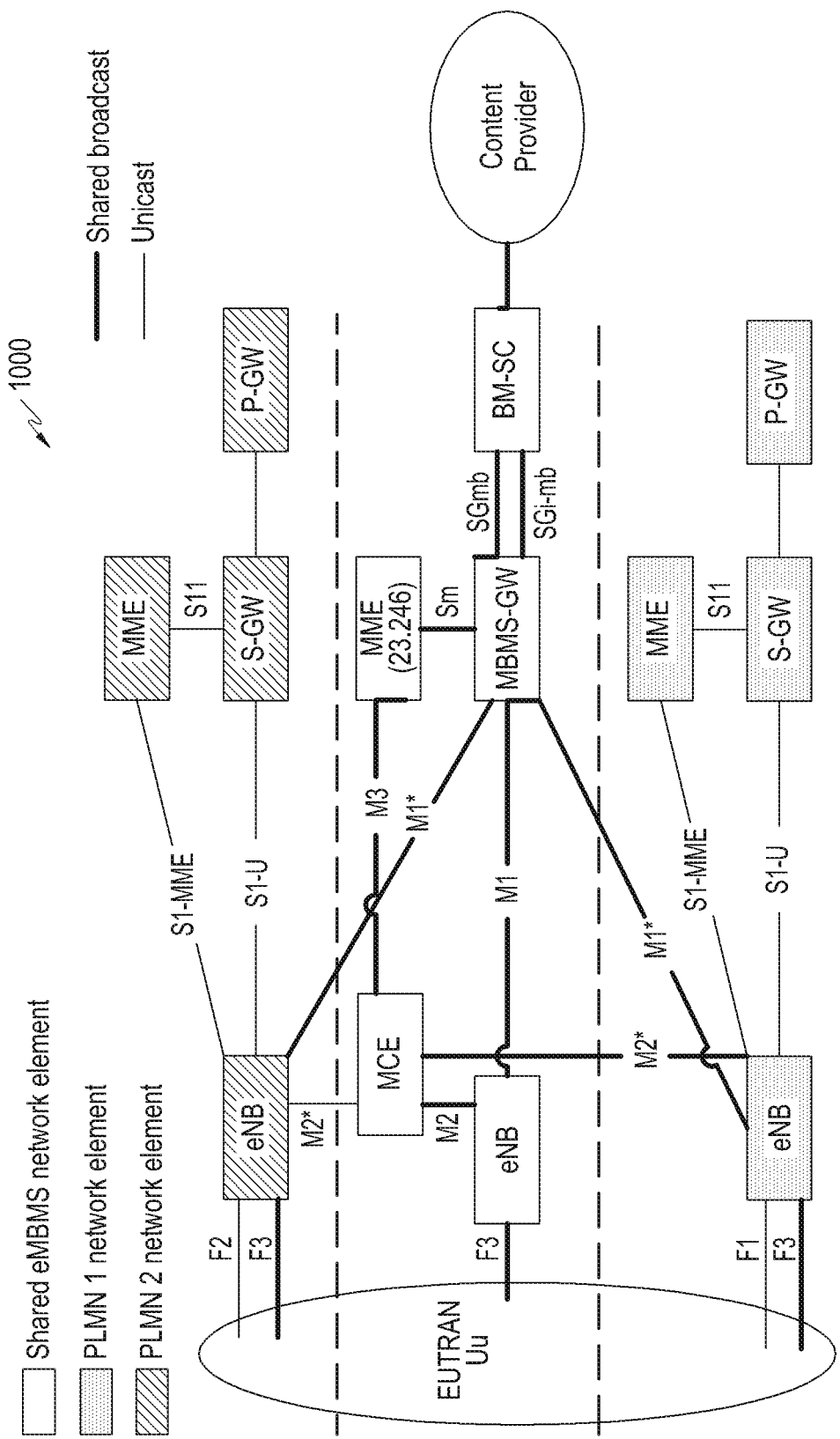
FIGS. 10*a*, 10*b*, and 10*c* are schematic diagrams illustrating data flow between network elements, according to an embodiment of the present invention.
Figure 10B:
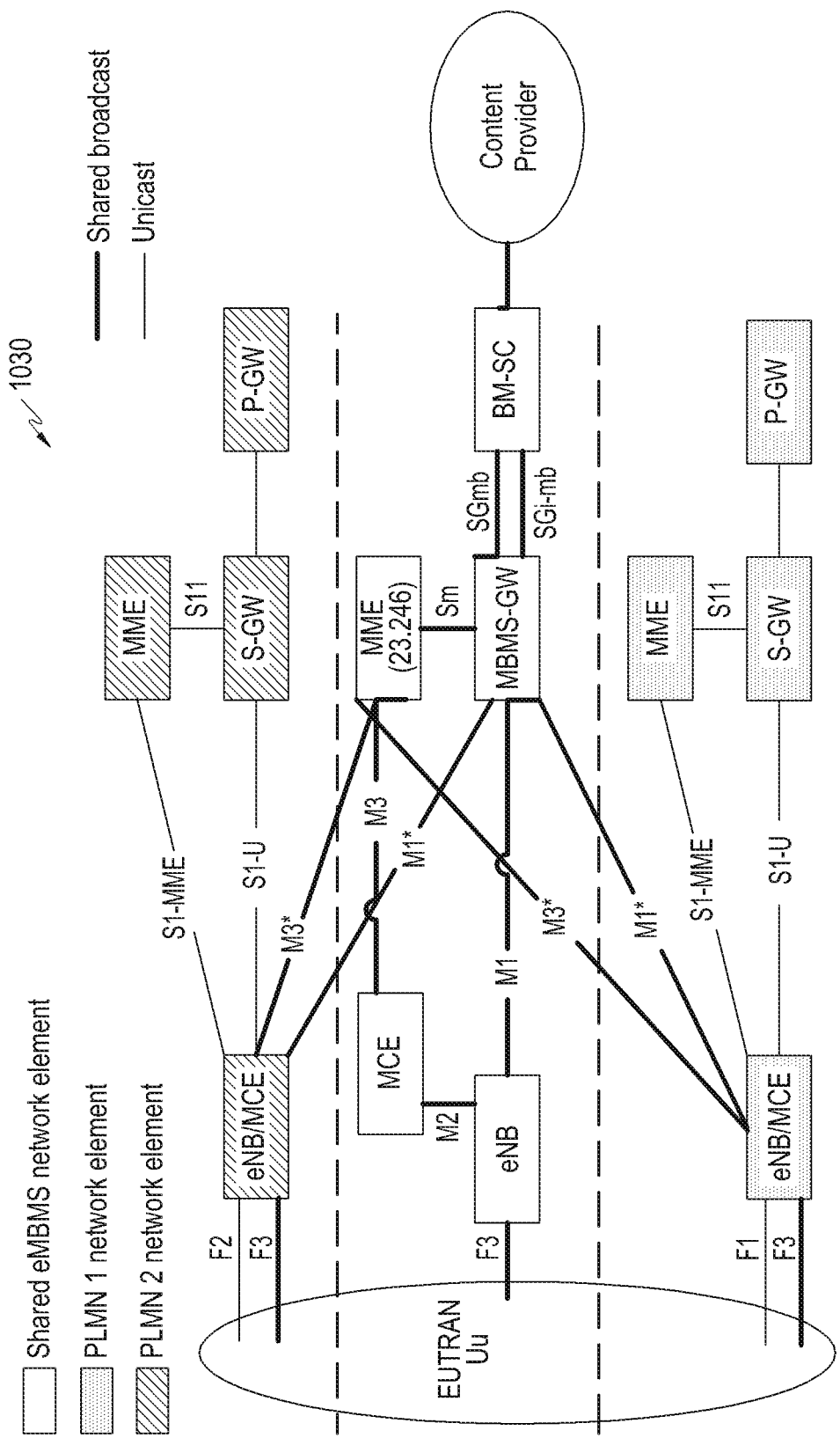
Figure 10C:
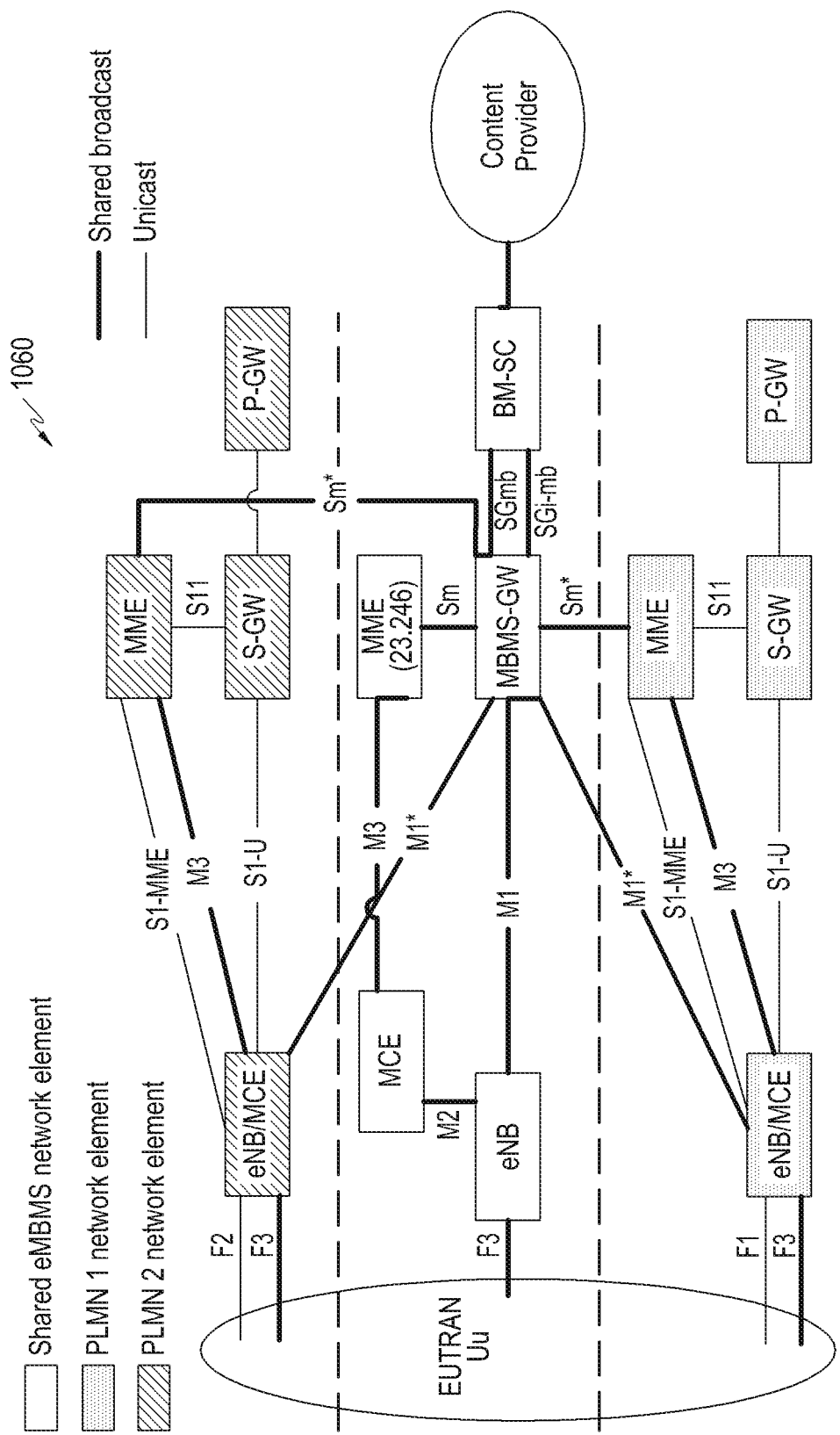

FIGS. 10a, 10b, and 10c are network diagrams 1000, 1030, 1060 respectively, illustrating data flow between network elements, according to an embodiment of the present invention. According to the diagrams 10a, 10b, and 10c, the network comprises at least one of an EUTRAN, plurality of eNodeB, a management control entity (MCE), plurality of mobility management entity (MME), MBMS gateway MBMS-GW, plurality of primary gateway P-GW, plurality of secondary gateway S-GW, and a content provider.

According to FIGS. 10a, 10b, and 10c, during communication between the EUTRAN and the content provider, data transfer can be performed over different network elements forming different network connection. During forming the network connection, one or more network elements can be used as shared MBMS network elements, while other can belong to PLMN network elements.

According to the diagrams 10a, 10b, and 10c, two different MBSFN areas can respectively launch a counting procedure at the same time. Because of the use of Area index in counting response message, confusion can occur and eNB could be unable to determine the initiating MBSFN area. One of the approaches to avoid this is that this is handled by a network implementation. For instance, MCE or operations, administration and management (OAM) can coordinate the counting by avoiding parallel counting. However, coordination on network side to ensure that "no concurrent counting procedures are initiated at any location" is probably doable in one operator's PLMNs but challenging across different operators PLMNs. In the present invention, it is possible that the dedicated MBMS carrier can be shared across different PLMNs of same or different operators. In such configurations, PCells of different PLMNs will share the dedicated eMBMS carrier for MBMS services. When counting request for such shared Scell is triggered, the counting response will be sent on respective PCell. It is possible that dedicated eMBMS cell areas and PCell MBMS areas can respectively launch counting procedure concurrently. The preset invention provides enhancement in the counting response message with identification fields to distinguish which MBSFN area/PLMN etc. is concerned with counting procedure and thereby help even parallel counting procedures to work concurrently.

According to legacy Release-10, MBMS counting response does not identify that MBMS Counting response is pertaining to which MBMS cell, i.e., it belongs to PCell or Dedicated MBMS Cell as area index is just numerical index value pointing to area id present in SystemInformationBlockType-13. According to the present invention, element containing the PLMN identity should be also indicated along with area index, so that network can easily distinguish that MBMS counting response belongs to PCell or Dedicated MBMS Cell.

In another embodiment of the present invention, it is provided to associate each of the counting response messages with the PCell and/or PLMN identity. For this purpose, additional fields are included for PCell Identity and/or PLMN Identity in counting response message. In Shared eMBMS network where the dedicated eMBMS carrier can be shared across operators as well, it may be necessary to find out under which operator/PCell area, there are more active MBMS service users. This information may be useful in terms of charging, shared EMBMS network (SEN) MBMS service provisioning and other statistical purposes.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The invention claimed is:

1. A method for providing multimedia broadcast multicast service (MBMS) operation, the method comprising
  receiving, by a User Equipment (UE), a common notification configuration message for a Multi-Cast Control Channel (MCCH) and System Information (SI) change from a network;
  identifying one or more scheduled MCCH change notifications or one or more scheduled SI change notifications using one or more parameters received in the common notification configuration message;
  configuring, by the UE, DRX sleep occasions and wake up occasions for the UE based on the one or more scheduled MCCH change notifications or the or more scheduled SI change notifications;
  monitoring for a MCCH change notification or a SI change notification on a Physical Downlink Control Channel (PDCCH) Format 1C scrambled with a M-RNTI on one of the wake up occasions;
  determining the MCCH change notification or the SI change notification based on DCI bits pertaining to SI or a MCCH of one or more MBMS areas; and
  decoding the MCCH change notification or the SI change notification on a PDSCH of CAS sub-frames or a PMCH channel.

2. The method of claim 1, wherein the SI change notification and the MCCH change notification are indicated together through a PDCCH DCI Format 1C on a non-MBSFN sub-frame, and the decoding is performed based on the M-RNTI.

3. The method of claim 1, wherein a new bit is defined for a SI change indication and 8 bits are defined for a MCCH change indication for 8 different MBSFN areas.

4. The method of claim 1, wherein the MCCH change notification is provided through one or more reserved sub-frames carrying Physical Downlink Control Channel (PDCCH)/-Downlink Control Information (DCI) on a dedicated MBMS cell, where the one or more reserved sub-frames comprises at least one of a Master Information Block (MIB), Primary Synchronization Signals (PSS), Secondary Synchronization Signals (SSS) and System Information Blocks (SIB) on a dedicated MBMS carrier.

5. The method for claim 1, further comprising:
  initializing a siModificationPeriod, subject to changes in MBMS area configurations for a MBMS-dedicated cell, where the siModificationPeriod is derived as a smallest MCCH modification period of all MBMS areas in the MBMS-dedicated cell.

6. The method of claim 5, wherein the siModificationPeriod is rf512, corresponding to 512 radio frame.

7. The method of claim 5, wherein the siModificationPeriod is a sub-multiple or a multiple of a MCCH modification period.

8. The method of claim 1, further comprising:
  initializing a siModificationPeriod, subject to changes in MBMS area configurations for a MBMS-dedicated cell, wherein the siModificationPeriod is implicitly derived as a shortest MCCH modification period in the MBMS-dedicated cell.

9. The method of claim 1, further comprising:
  receiving, by the UE, the MCCH change notification or the SI change notifications periodically on the PDCCH of a CAS sub-frame, where occasions of the one or more scheduled MCCH change notifications are common for one or more MCCHs that are configured and configurable by one or more parameters included in a SystemInformationBlockType13.

10. The method of claim 9, wherein the one or more parameters included in the SystemInformationBlockType13 comprise:
  a repetition coefficient;
  a radio frame offset; and
  a SI modification period.

11. The method of claim 10, wherein occasions for the common notification configuration message are based on a MCCH with a shortest modification period.

12. The method of claim 11, wherein the shortest modification period corresponds to a lowest value of a MCCH ModificationPeriod of all of the one or more MCCHs that are configured.

13. The method of claim 10, wherein the MCCH change notification or the SI change notification is scheduled in radio frames for which an SFN MOD notification repetition period is equal to a notificationOffset, where a notificationRepetitionCoefficient indicates a number of repetitions of MCCH change or SI change indication in the SI modification period.

14. The method of claim 13, wherein the notificationRepetitionCoefficient and the notificationOffset define a selected CAS that is a System Frame Number (SFN) of a radio frame having a CAS sub-frame configured to carry a notification.

15. The method of claim 14, wherein the notificationOffset is configured as 40 ms or multiples of 40 ms to align with occurrence of the CAS sub-frame.

16. The method of claim 1, further comprising:
  enabling, by the UE, continuity of a service during a change in a MBMS-dedicated cell, the MBMS-dedicated cell carrying an MBMS service, wherein the change in the MBMS-dedicated cell is due to at least one of mobility, service unavailability, service signal strength declining below a threshold level or mobility of the UE;
  informing, by the UE, an MBMS reception status on the MBMS-dedicated cell on receiving an interest indication message on a PCell; and
  setting up, by the UE, a new MBMS-dedicated cell which provides the MBMS service to the UE.

17. The method of claim 16, wherein the UE receiving the MBMS service through the MBMS-dedicated cell performs measurements for MBMS signal strength and service quality.

18. The method of claim 17, wherein a measurement report is transmitted via an uplink on the PCell and includes an identification of the MBMS-dedicated cell and at least one of a MBSFN area, a PMCH, or the MBMS service.

19. The method of claim 17, wherein the network adjusts transmission parameters to meet a signal and a quality of a maximum of receiving UEs based on a measurement reports from the UE.

20. The method of claim 17, wherein the UE is configured to utilize a unicast mode of MBMS service reception based on a signal or a quality of the MBMS service not being met with a dedicated MBMS carrier mode of MBMS service reception.

* * * * *